United States Patent [19]
Schulz

[11] Patent Number: 5,280,981
[45] Date of Patent: Jan. 25, 1994

[54] END EFFECTOR WITH LOAD-SENSITIVE DIGIT ACTUATION MECHANISMS

[75] Inventor: Gordon R. Schulz, Villa Park, Calif.

[73] Assignee: Odetics, Inc., Anaheim, Calif.

[21] Appl. No.: 649,479

[22] Filed: Feb. 1, 1991

[51] Int. Cl.$^5$ .............................................. B25J 15/02
[52] U.S. Cl. ................................... 294/106; 294/115; 901/34; 901/38; 901/46
[58] Field of Search ............... 294/106, 111, 115, 907, 294/86.4; 901/19, 20, 25, 32, 34, 36, 37, 38, 46, 47

[56] References Cited

U.S. PATENT DOCUMENTS

| | | | |
|---|---|---|---|
| 3,370,213 | 2/1968 | Rose | 294/106 X |
| 3,866,966 | 2/1975 | Skinner, II | 294/106 |
| 3,901,547 | 8/1975 | Skinner, II | 294/106 X |
| 4,113,115 | 9/1978 | Yoshio | 901/38 X |
| 4,351,553 | 9/1982 | Rovetta et al. | |
| 4,364,593 | 12/1982 | Maeda | |
| 4,489,248 | 12/1984 | Petersen | |
| 4,579,380 | 4/1986 | Zaremsky et al. | 901/38 X |
| 4,598,942 | 7/1986 | Shum et al. | 294/106 |
| 4,600,357 | 7/1986 | Coules | 901/38 X |
| 4,957,320 | 9/1990 | Ulrich | 294/106 |
| 4,962,676 | 10/1990 | Vainstock | 901/25 X |
| 5,108,140 | 4/1992 | Bartholet | 294/106 |

FOREIGN PATENT DOCUMENTS 2166710  5/1986  United Kingdom .

OTHER PUBLICATIONS

"Robotic Hand Approaches Human Dexterity", *Machine Design* (Jun. 26, 1986), pp. 40–44.
Excerpts from *Robots*, Philip de Ste. Croix (ed), (Salamander Books, 1985).
Brochure, Victory Enterprises Technology, Inc. "Victory Intelligent Dexterous Hand and Forearm".

*Primary Examiner*—David M. Mitchell
*Assistant Examiner*—Dean J. Kramer
*Attorney, Agent, or Firm*—Graham & James

[57] ABSTRACT

Each of a plurality of digits within a reconfigurable end effector is both rotated and maneuvered for grasping by a single small motor coupled to a drive shaft for the digit through a load-responsive two-speed drive arrangement. The drive arrangement couples the motor directly to the drive shaft through a slip clutch for rapid digit positioning for light load or no load conditions on the digit, then alternatively through an oscillating sprag clutch arrangement for incrementing the drive shaft at a substantially different gear ratio for low speed, high force movement of the digit when substantial loads are encountered. High breakaway friction prevents back drive of the drive shaft without the need for braking apparatus. The motor also rotatably drives a turret in which the digit is mounted through a second slip clutch until a desired rotational position is reached. The turret is locked in the selected rotational position by deenergizing a solenoid to allow a pivoting pawl to wedge a ball into one of a plurality of detents in the turret. An optical sensor responds to the presence of the detents to determine the rotational position of the turret. The drive shaft is axially movable in response to substantial loads on the digit against the resistance of a compressible sprain spring, and a Hall Effect sensor determines the load on the digit by measuring the axial movement. A pair of rotary optical position sensors are employed to determine the rotational positions of the drive shaft and the shaft of the motor.

29 Claims, 10 Drawing Sheets

END EFFECTOR WITH LOAD-SENSITIVE DIGIT ACTUATION MECHANISMS

BACKGROUND OF THE INVENTION

1. Field of the Invention

The present invention relates to end effectors used in robotics and other applications, and more particularly to reconfigurable end effectors having a plurality of digits mounted for rotational and pivoting movement to accomplish the grasping of objects of various different shapes.

2. Description of Related Art

End effectors, sometimes referred to as mechanical hands or robotic hands, are employed for a wide range of applications where mechanical manipulation is required. In particular, virtually any industrial or other application of robotics requires an end effector of some type to provide a manipulation capability. Accordingly, a wide variety of different types of end effectors are known in the art and a great deal of effort has gone into their design and development.

There are various types of end effectors including those designed for specific industrial applications and those which are application non-specific and are reconfigurable to adapt to various tasks. Application non-specific end effectors are typically designed to provide a high degree of reconfigurability and manipulation capability. Such effectors are typically complex, have a large degree of freedom and employ complex actuation mechanisms. They may attempt to emulate the human hand, and are often referred to as robotic hands. Typically, robotic hands employ three or four digits, with each digit having two or three degrees of freedom. Examples of robotic hands include the Utah-MIT dextrous hand described in *Machine Design* (Jun. 26, 1986), page 40, the so-called Salisbury hand described in *Robots*, Philip de Ste. Croix, ed. (Salamander Books 1985), page 53, and the reconfigurable hand manufactured by Victory Enterprises Technology, Inc. of Austin, Tex.

A further example of a reconfigurable end effector or robotic hand is described in co-pending application Ser. No. 07/512,042 now U.S. Pat. No. 5,108,140 of Bartholet, RECONFIGURABLE END EFFECTOR, filed Apr. 17, 1990 and commonly assigned with the present application. The end effector described in the Bartholet application employs three digits, each having two pivoting degrees of freedom and a rotational degree of freedom. The digits have an asymmetrical configuration, with two of them rotating about an offset axis and a third rotating about a non-offset axis, allowing the digits to reconfigure about a payload. Each digit includes an actuation mechanism for driving the pivoting degrees of freedom, and including a differential transmission mechanism therein in conjunction with a double parallelogram configuration formed by the moving segments. Such arrangement provides a selective enveloping or parallel vice grip grasping action.

Although end effectors such as that described in the Bartholet application have various advantages over previous end effectors so as to be capable of functioning in a highly advantageous and effective manner for many applications, there is room for further improvements in such devices. Typical of such devices is a digit actuation mechanism having a motor directly coupled through a speed reduction mechanism of fixed gear ratio and a clutch/brake mechanism to a drive member such as a lead screw to provide the pivoting action of the digit. The actuation mechanism must be capable of handling high mode loads encountered by the digit, while at the same time being capable of moving the digit at a reasonable speed to the different desired positions thereof. This typically requires a relatively large motor, which makes it even more difficult to design a small end effector with adequate power.

Sensing of the digits to determine their positions and load conditions in presently known end effectors typically requires relatively complex arrangements of strain gauges and other instruments, due in part to the need to constantly monitor the gripping and the rotational positions of each digit independently. Momentary malfunctioning of the control system can result in loss of registration. In some cases the striking of another digit or immovable object is not sensed in time, and damage to the digit results.

Where the digits are operated by lead screws, lead screws of the circulating ball type are often required in order to minimize friction, but at considerable expense. Back driving of the lead screw can also be a problem, and typically a brake is required to prevent this from happening. Typical arrangements for rotating the digits are somewhat inefficient, and some require energy wasteful active devices to lock the digits in their desired rotational positions. Registration and tracking of digit rotation can be difficult. Certain arrangements of the prior art end effectors require two motors per digit, one to rotate the digit and the other to provide pivoting movement of the various segments of the digit.

It would therefore be advantageous to provide a reconfigurable end effector which overcomes the disadvantages of prior art end effectors. Among other things, each digit would desirably be operated by a single motor of relatively small size. The actuation mechanism for the digit should preferably be of economical construction and capable of preventing back drive without the need for separate braking apparatus. It would also be desirable to provide an actuation mechanism which simplifies the sensing operation.

BRIEF SUMMARY OF THE INVENTION

Reconfigurable end effectors in accordance with the invention employ a plurality of digits, each of which is controlled by a single motor of relatively small size. The motor is coupled to the digit through an actuation mechanism which senses the load on the digit to vary the drive ratio accordingly. This enables the digit to move at high velocity under low load conditions to facilitate rapid relocation of the digit. At the same time, high load conditions on the digit result in a very low velocity drive so that the driving power of the relatively small motor is optimized. The sensing arrangement utilized in conjunction with the digit is simplified, as is the lead screw arrangement for driving the digit. Due to the nature of the digit actuation mechanism, back drive of the lead screw is not a problem.

In a preferred arrangement of a reconfigurable end effector according to the invention, each of the three digits of the end effector are controlled by a separate motor of relatively small size. Each motor is coupled to the associated digit by an actuation mechanism which provides different drive ratios in accordance with the load on the digit. The actuation mechanism functions much in the manner of a two-speed automatic transmission by driving the digit at high velocity when the load on the digit is below a predetermined level and at a substantially lower velocity when the load on the digit is above the predetermined level. The single motor associated with each digit is employed to rotate the digit as well as to pivot the various segments of the digit.

The actuation mechanism includes an economical lead screw arrangement in which the segments of the digit are pivoted under the control of linkage coupled between the digit and a threaded nut mounted on a threaded drive shaft. The drive shaft moves axially against the resistance of a strain spring within the actuation mechanism as a function of reactive loads on the digit, and sensing is accomplished by a Hall Effect sensor which measures the proximity thereto of the magnet at the end of the drive shaft. The high break away friction of the actuation mechanism prevents back drive without the need for a brake.

In addition to the drive shaft and the nut thereon which is coupled by linkage to the digit, the actuation mechanism includes a gear mounted on the shaft of the motor and in constant mesh, through an intermediate gear, with a gear encircling and coupled to the drive shaft through a slip clutch. With the load on the digit below the predetermined level, such as when the digit is being moved into a position for engagement with an object to be grasped, the slip clutch couples the gear directly to the drive shaft to drive the drive shaft and thereby the digit at a high velocity, low load gear ratio. However, when the load on the digit is above the predetermined level, such as when the digit engages an object to be grasped, the slip clutch begins to slip, thereby effectively uncoupling the gear from the drive shaft. At the same time, a sprag clutch arrangement comes into play to incrementally advance the drive shaft at a much slower rate, so that a different gear ratio is employed to provide a low velocity, high load driving condition.

The sprag clutch arrangement includes an eccentric bearing which is mounted on the motor shaft and is seated within a slot at the end of an arm extending from a hollow, generally cylindrical cyclic hoop surrounding a portion of the drive shaft. Rotation of the motor shaft and the eccentric bearing thereon produces oscillation of the arm and thereby the cyclic hoop about the drive shaft. The cyclic hoop is periodically momentarily coupled to advance the drive shaft through a small increment of movement using an arrangement of sprags and sprag carriers disposed between the cyclic hoop and the drive shaft. The sprag carriers are disposed in spaced-apart relation relative to one another within the space between the cyclic hoop and the drive shaft, and each of the sprags is disposed between a different pair of the sprag carriers. Resilient means associated with the sprags bias the sprags in circumferential directions. As the cyclic hoop oscillates, the sprags are periodically momentarily wedged between the drive shaft and the cyclic hoop to advance the lead screw by a small increment of movement.

The relatively small motor associated with each digit is also employed to rotate the digit to a selected one of a plurality of different rotational positions. A rotatable turret which mounts the digit is coupled to the drive shaft through a second slip clutch so as to rotate in response to rotation of the drive shaft by the motor. Rotation of the turret occurs as long as a solenoid is energized so as to retract a pawl and an associated ball from the turret. When energizing of the solenoid is terminated however, the pawl pivots to force the ball into one of a plurality of detents located around the turret to define different possible rotational positions thereof, and the second slip clutch thereafter slips to allow the turret to remain in the selected position. When the solenoid is again energized, the associated pawl pivots to allow retraction of the ball from the detent and the second slip clutch again engages to rotate the turret.

Sensing of the rotational position of the turret is accomplished using an optical sensor disposed in a fixed location adjacent the rotatable turret. The optical sensor senses the presence of each of the plurality of detents thereat. During initialization of the digit, the turret is rotatably driven to a reference position in which rotation of the turret is stopped upon striking a stop member. Thereafter, each detent which passes the optical sensor is counted in order to determine the rotational position of the turret.

Measurement of the load encountered by the digit is accomplished by an arrangement which utilizes the axial displaceability of the drive shaft against the resistance of a resilient strain spring which is disposed about the drive shaft between the second slip clutch and a bearing arrangement disposed adjacent a flange on the shaft. As the strain spring undergoes increasing compression in response to increasing loads on the digit, the accompanying displacement of the drive shaft is measured by a Hall Effect sensor disposed in a fixed location adjacent a magnet mounted on the bottom end of the drive shaft. The rotational positions of the drive shaft and the motor shaft are determined by a pair of optical sensors. One such optical sensor is coupled to a gear mounted on the drive shaft. The other optical sensor is disposed in association with the motor shaft.

The first and second slip clutches are comprised of a common gear coupled to be driven by the motor and engaging an opposite pair of generally disk-shaped members in sliding engagement therewith. One such disk-shaped member includes pins which extend into the turret to rotate the turret in response to rotation of the common gear except when the turret is locked in a desired rotational position by the solenoid operated pawl and associated ball. The other generally disk-shaped member comprises a sprag assembly having the sprag carriers mounted thereon with pins which extend through slots in the gear mounted on the drive shaft and into mating apertures in a spring having a central aperture engaging a generally cylindrical member mounted on the drive shaft. Rotation of the sprag assembly causes the pins to engage the slots in the gear and thereby rotate the drive shaft via the gear. The spring resiliently compresses the common gear and the opposite pair of generally disk-shaped members to provide the first and second slip clutches with a desired amount of friction. At the same time, such arrangement permits axial movement of the drive shaft against the resistance of the strain spring as high loads are encountered by the digit.

End effectors in accordance with the invention provide numerous advantages. The ability to use a single relatively small motor to control each digit in combination with a sprag clutch arrangement which is driven by the small motor in a manner providing substantial moment when required, allows such end effectors to be made in the relatively small sizes required for many applications. The single motor drive in combination with a threaded drive shaft within a turret or other rotatable housing for the digit permits rotation of the turret without changing the gripping position of the digit. Because turret rotation is independent of finger grip positioning, control of the digit is simplified inasmuch as simultaneous monitoring of digit position and turret rotation are not required. The turret itself is rotatably positioned in predetermined locations by detents, providing for simple and precise registration. This and the absence of any backdrive in the digit positioning mechanism simplify the process of monitoring the gripping and rotational positions of the digit.

The dual ratio transmission provided by the digit actuation mechanism functions in conjunction with the optical sensors of drive shaft and motor shaft position to provide digital type sensing. Load range sensing is provided by the shift point which denotes the presence of a minimum load of predetermined size. Also, the load range shift point defines a minimum useful gripping force and starting point for purposes of controlling the digit. This can be used as a calibration point, for example, in calibrating the Hall Effect sensor.

The ability to detect the shift point in the dual ratio transmission is also useful in the sensing and control of the digit. For one thing, the shift point signals drive travel limits for the digit. Thus, if control of the digit momentarily malfunctions and drive of the digit reaches either of opposite limits, the resulting transmission shift can be detected to stop the drive of the digit. During initialization, it is only necessary to sense when one of the opposite limits is reached. When searching for an object to be gripped, the shifting of the transmission denotes either that the object has been engaged or that the limit of digit travel has been reached. The information provided by the various sensors can then be used to make a control decision.

The dual ratio transmission provides still further advantages in the form of simplified motor servo design and a reduced motor speed range. The low load, high speed drive requires little torque, enabling use of relatively small slip clutches for both digit movement and digit rotation. If two digits collide, the slip clutches prevent damage. In essence, a minimum amount of torque as provided by the slip clutches suffices, except when gripping an object.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
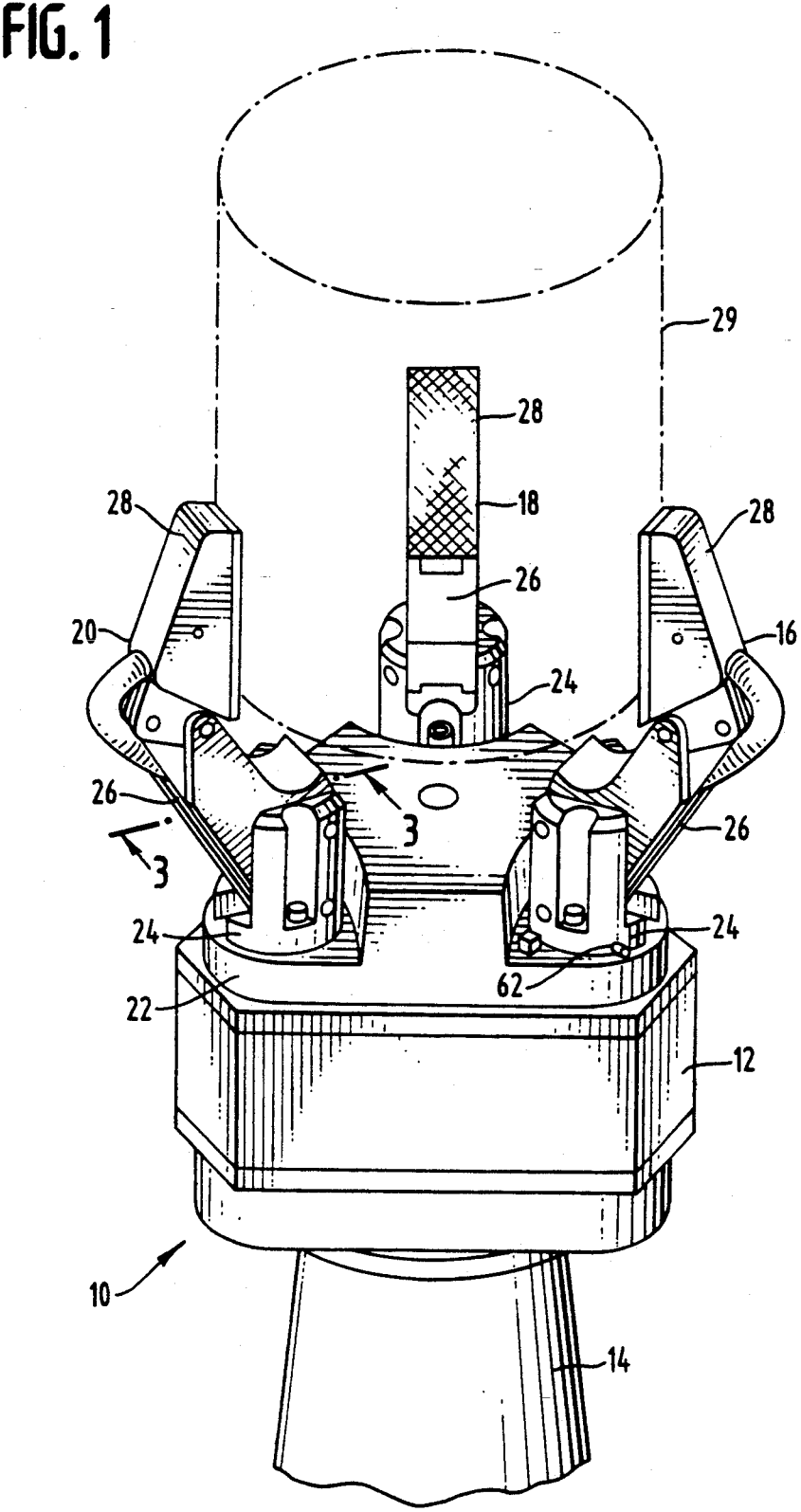
FIG. 1 is a perspective view of an end effector having three digits employing load-sensitive digit actuation mechanisms in accordance with the invention.

FIG. 1 shows an end effector 10 which includes an enclosed housing 12 mounted on the top of a supporting base 14. Three different digits 16, 18 and 20 are rotatably mounted at the opposite corners of a generally triangular plate 22 at the top of the housing 12. The digits 16, 18 and 20 which are of essentially like configuration are generally equidistantly spaced from each other so as to reside at the corners of an equilateral triangle.

The digit 16 is rotatably mounted on the plate 22 by a digit base 24, as are the digits 18 and 20. The digit 16 includes a base segment 26 which is pivotally coupled to the digit base 24, and a tip segment 28 pivotally coupled to the base segment 26. The digits 18 and 20 are similarly configured with base segments 26 and tip segments 28. As described in detail hereafter, the end effector 10 is capable of gripping a variety of different objects of different sizes and shapes, with one such object 29 being shown in dotted outline by way of example in FIG. 1. This is accomplished by rotating the digit base 24 of each of the digits 16, 18 and 20 to a desired rotational position, and by pivoting the base and tip segments 26 and 28 of each digit in a desired manner.

In accordance with the invention, the digits 16, 18 and 20 are controlled by load-sensitive digit actuation mechanisms contained within the housing 12. Each such digit actuation mechanism determines the rotational position of the digit via the digit base 24 in addition to manipulating the base and tip segments 26 and 28 in a desired manner. Inasmuch as the digit actuation mechanisms are of like configuration, as are the digits 16, 18 and 20 themselves, only the digit actuation mechanism associated with the digit 16 will be described hereafter.

Figure 2:
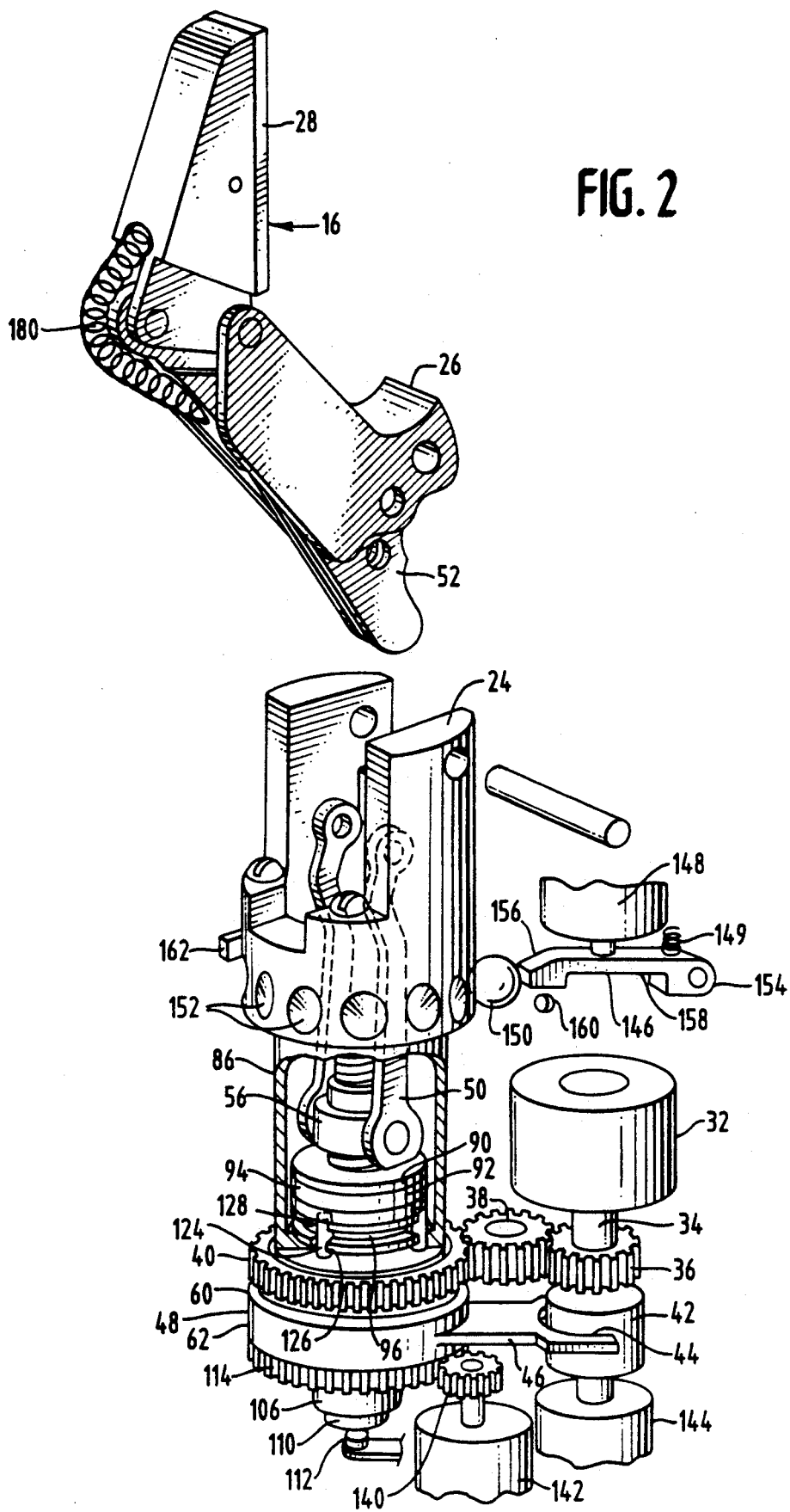
FIG. 2 is a broken-away perspective view of one of the digits of the end effector of FIG. 1 showing the load-sensitive digit actuation mechanism thereof.

FIG. 2 shows the digit 16 together with a load-sensitive digit actuation mechanism 30 therefore in accordance with the invention. The actuation mechanism 30 rotatably positions the digit 16 in addition to actuating the base and tip segments 26 and 28 thereof using a single, relatively small motor 32. The use of the relatively small motor 32 is made possible in large part by the load-sensitive dual driving rate nature of the actuation mechanism 30 as described hereafter.

The motor 32 shown in FIG. 2 has a shaft 34 on which a gear 36 is mounted. The gear 36 continuously meshes with an intermediate gear 38, and the intermediate gear 38 continuously meshes with a gear 40. In this manner, the gear 40 is continuously coupled to the motor 32. The motor shaft 34 also has an eccentric bearing 42 mounted thereon which resides within a slot 44 within an arm 46 extending from a cyclic hoop 48. Rotation of the motor shaft 34 causes the arm 46 and thus the cyclic hoop 48 to oscillate through the action of the eccentric bearing 42.

The digit 16 is actuated by linkage which is described in detail hereafter and which includes a drive linkage 50, a differential drive pivot member 52, and a digit linkage 54. The operation of the linkages 50 and 54 and the drive pivot member 52 to position the base and tip segments 26 and 28 of the digit 16 in a desired fashion is described in detail hereafter in connection with FIGS. 8-11. The description in connection with such figures sets forth the manner in which the drive linkage 50 and the digit linkage 54 result in the desired positioning of the base and tip segments 26 and 28 as a threaded nut 56 to which the lower end of the drive linkage 50 is coupled is raised and lowered by a threaded portion of a drive shaft 58 on which the nut 56 is mounted. As the nut 56 moves up and down on the drive shaft 58 in response to rotation of the drive shaft 58, the drive linkage 50 responds by positioning the base and tip segments 26 and 28 in a desired manner.

As will become apparent from the discussion to follow, the high breakaway friction of such arrangement prevents backdrive of the drive shaft 58. Therefore, the need for a separate braking mechanism to prevent backdrive is eliminated.

During operation of the end effector 10, each of the digits 16, 18 and 20 is periodically moved into and out of contact with the various different objects being gripped by the end effector. As each digit approaches an object to be gripped, there is essentially no load on the digit until contact with the object is made. Similarly, when an object being gripped is released, movement of each digit away from the object is accompanied by little or no load on the digit. When such low load or no load conditions exist, it is desirable that the digit move quickly and therefore at a relatively high speed. Conversely, when the object to be gripped in engaged by the digit so as to substantially load the digit, it is desired that the digit be moved at a much slower speed and in a manner so that substantial force can be exerted on the object by the digit if necessary. The actuation mechanism 30 accomplishes these desirable objectives by driving the digit at a relatively high speed for low load or no load conditions, and conversely at a much lower speed where much higher load conditions are encountered, all in response to the magnitude of the load being applied to the digit. The actuation mechanism 30 functions much in the same manner as a two-speed automatic transmission by shifting between two different gear ratios or rates of drive of the drive shaft 58 based on the load encountered by the digit 16.

As previously described, the gear 40 remains directly coupled to the motor shaft 34 through the intermediate gear 38 and the gear 36 so as to continue rotating as long as the motor shaft 34 rotates. The gear 40 is coupled to the drive shaft 58 through a first slip clutch 60 which does not slip and thereby provides direct coupling of the gear 40 to the drive shaft 58 so long as resistance of the drive shaft 58 to rotation is below a predetermined level. The resistance is below the predetermined level as long as the digit 16 encounters no load or a relatively small load. The direct coupling of the gear 40 to the drive shaft 58 through the slip clutch 60 under such low load or no load conditions provide a gear ratio which causes the drive shaft 58 to rotate at a relatively high speed to quickly move the digit 16. However, when a high load condition is encountered by the digit 16, this translates into resistance of the drive shaft 58 to rotation which exceeds the predetermined level, and this results in slippage of the clutch 60 so that the gear 40 is no longer directly coupled to the drive shaft 58. Instead, the motor 32 and its shaft 34 are coupled to drive the drive shaft 58 at a substantially different gear ratio and at a substantially slower speed through the arrangement which includes the eccentric bearing 42 and the arm 46 of the cyclic hoop 48.

The cyclic hoop 48 forms a part of a sprag clutch arrangement 62 which responds to the oscillating motion of the cyclic hoop 40 to periodically advance the drive shaft 58 at a very slow rate, in incremental fashion. The sprag clutch arrangement 62 continues to drive the drive shaft 58 in this low speed, high load fashion as long as the load on the digit 16 exceed the threshold level. The slip clutch 60 slips, allowing the sprag clutch assembly 62 to drive the drive shaft 58.

When the load on the digit 16 again diminishes so as to reduce the rotational resistance of the drive shaft 58 below the predetermined level, the slip clutch 60 once again engages to provide direct coupling of the gear 40 to the drive shaft 58 so that the drive shaft 58 is again driven in the low load, high speed manner.

Figure 5:
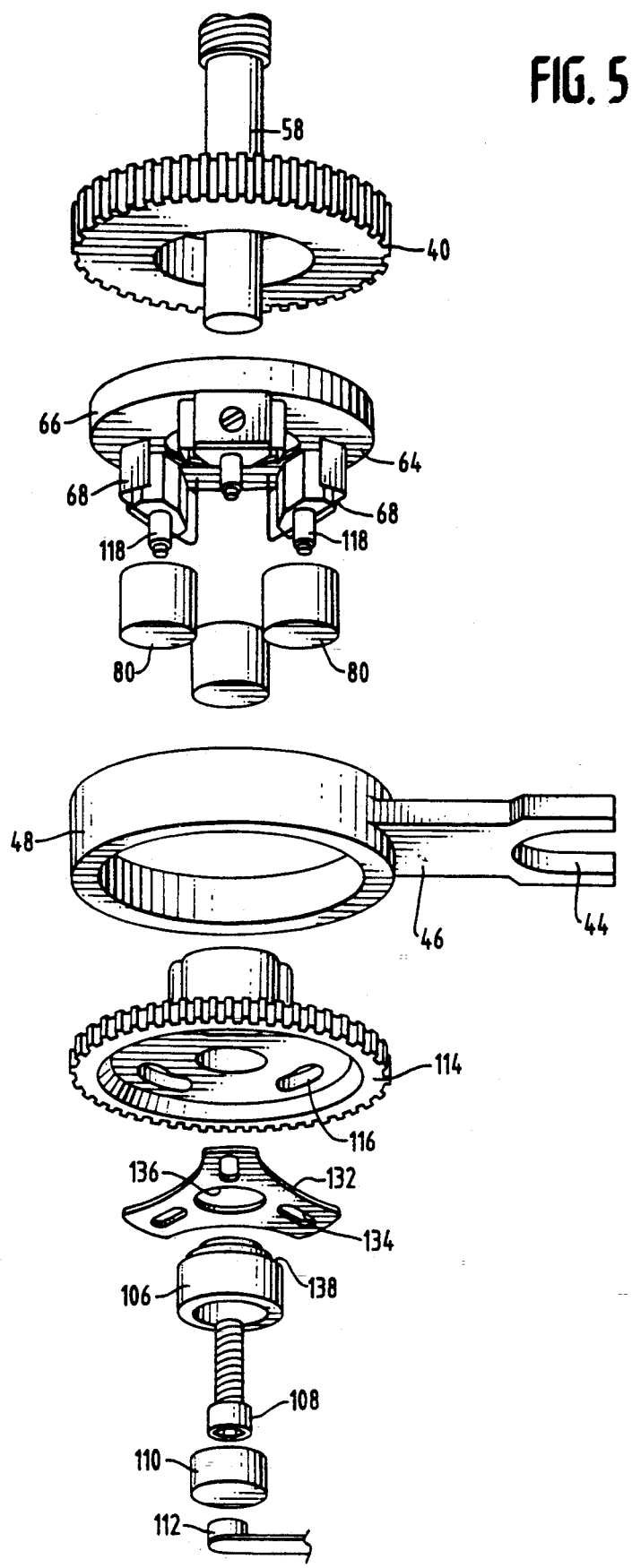
FIG. 5 is an exploded perspective view of the lower portion of the digit actuation mechanism of FIG. 2 showing the sprag clutch assembly.
Figure 6:
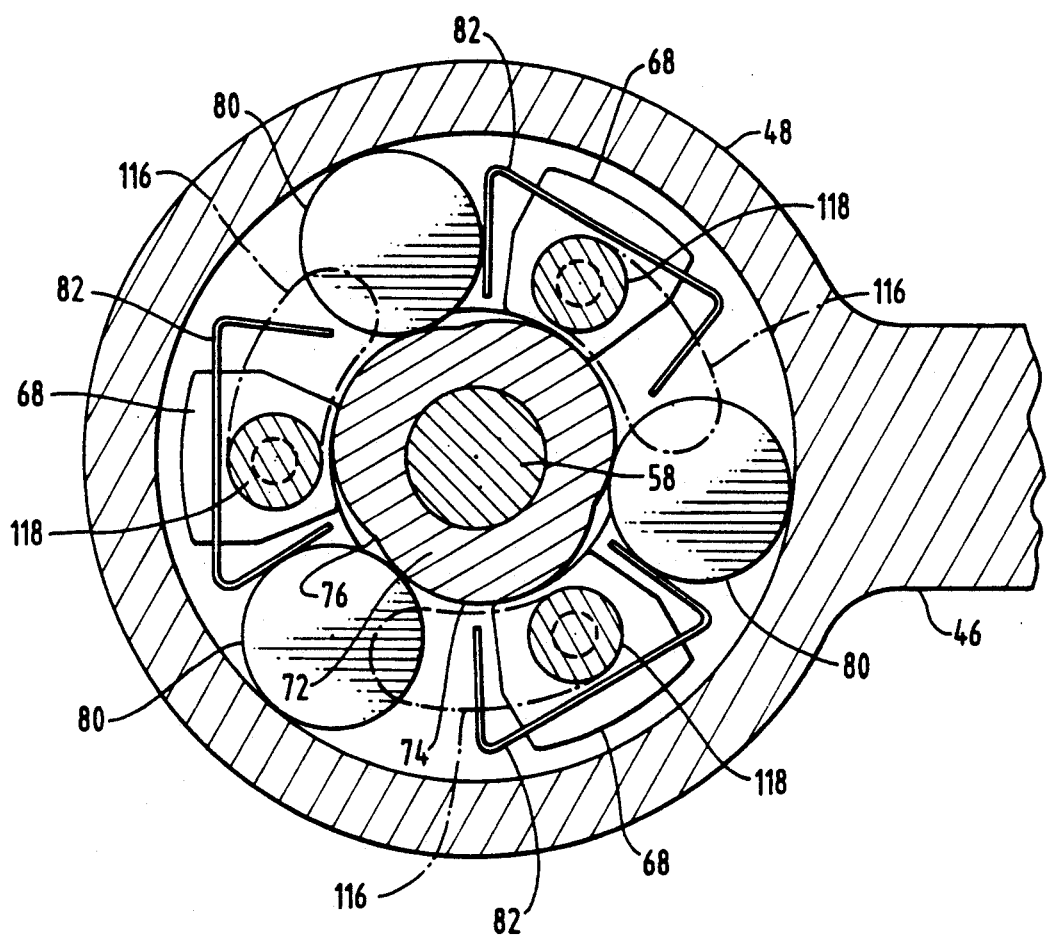
FIG. 6 is a bottom view of the sprag clutch assembly.

FIGS. 5 and 6 show the sprag clutch arrangement 62 in greater detail. As shown therein, the oscillating cyclic hoop 48 encircles a portion of the drive shaft 58 just below the slip clutch 60. The slip clutch 60 includes a generally disk-shaped member forming a sprag carrier assembly 64. The sprag carrier assembly 64 is comprised of a disk 66 having three different sprag carriers 68 disposed on a lower surface thereof. The disk 66 has a central aperture 70 through which the drive shaft 58 extends in a manner permitting rotation of the drive shaft 58 relative to the disk 66. However, the disk 66 is selectively coupled to the drive shaft 58 in a manner described hereafter so that the slip clutch 60 can provide direct drive of the drive shaft 58 under light load or no load conditions.

The disk 66 resides within a lower portion of the gear 40 so as to form the first slip clutch 60. The disk 66 engages the gear 40 with a desired amount of friction so that slippage of the gear 40 relative to the disk 66 does not occur as long as the rotational resistance of the drive shaft 58 is below the predetermined level. However, when the rotational resistance exceeds the predetermined level, the gear 40 slips relative to the disk 66 of the sprag carrier assembly 64.

As shown in FIG. 6, the portion of the drive shaft 58 which is encircled by the cyclic hoop 48 has a collar 72 thereof which is somewhat non-cylindrical to the extent that it has raised portions 74 and dimpled portions 76 thereof. The sprag carriers 68 on the bottom of the disk 66 reside within and are generally equally spaced around the space between the cyclic hoop 48 and collar 72 on the drive shaft 58. Disposed between each adjacent pair of the sprag carriers 68 is a generally cylindrical sprag 80. Inasmuch as there are three sprag carriers 68 and three spaces therebetween, there are three sprags 80. Each of the sprag carriers 68 has a spring 82 mounted thereon. Each spring 82 has a pair of opposite ends extending into the spaces on opposite sides of its sprag carrier 68 for biasing engagement of the sprags 80 depending upon the positions of the sprags 80 within the spaces.

As shown in FIG. 6, the sprags 80 are biased to wedge between the inside surface of the cyclic hoop 48 and the raised portions 76 of the collar 72 on the drive shaft 58, and one end of each spring 82 biases an associated one of the sprags 80 into such wedging position. As the cyclic hoop 48 oscillates, the sprags 80 are repeatedly wedged between the inside of the cyclic hoop 48 and the raised portions 76, then released momentarily. Thus, as viewed in FIG. 6, each incremental counterclockwise motion of the cyclic hoop 48 wedges the sprags 80 between the inner surface of the cyclic hoop 48 and the raised portions 76 of the collar 72. As the cyclic hoop 48 is then moved in a clockwise direction, the sprags 80 are momentarily unwedged. The sprags 80 are again wedged between the inner surface of the cyclic hoop 48 and the raised portions 76 of the collar 72 with the next counter-clockwise incremental motion of the cyclic hoop 48.

In this fashion, the continued oscillation of the cyclic hoop 48 rotatably advances the drive shaft 58 in small increments and at a rate which is many times less than that provided by direct coupling of the gear 40 to the drive shaft 58 through the slip clutch 60. At the same time, the effective gear ratio is such that a substantial amount of force is applied in the rotation of the drive shaft 58. In the present example, the slip clutch 60 provides a gear ratio of 180:1, whereas the sprag clutch assembly provides a gear ratio of 5:1. The arm 46 coupled to the cyclic hoop 48 forms a tangential moment arm which provides the mechanical advantage of a ratchet. In addition, the slip clutch 60 prevents backdrive during return movement of the ratchet.

The sprag clutch arrangement 62 is capable of operation in either direction in response to operation of the motor 32 in either direction. Because the motor 32 always drives the gear 40 in the direction of motor rotation, the slip clutch 60 formed by the gear 40 with the disk 66 of the sprag carrier assembly 64 biases the sprag carriers 68 and the sprags 80 for incremental advancement of the drive shaft 58 in the corresponding direction. As shown in FIG. 6, the spaces between the sprag carriers 68 permit the sprags 80 to be wedged in either of opposite positions therein under the biasing of the opposite ends of the springs 82. The symmetrical, bidirectional operating capability of the sprag clutch arrangement 62 is important to the proper operation of the digit 16.

Figure 3:
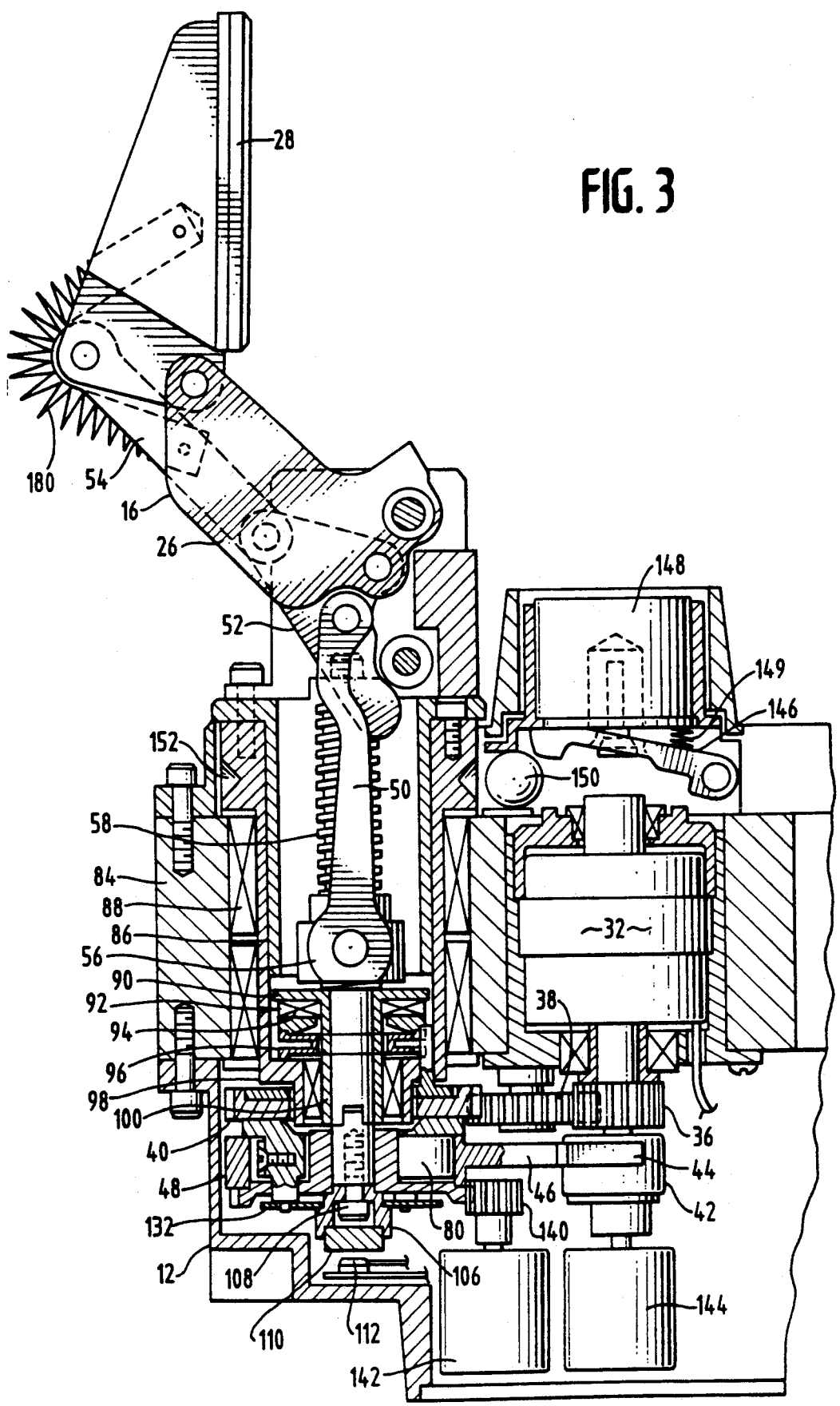
FIG. 3 is a cross-sectional view of the digit actuation mechanism of FIG. 2.
Figure 4:
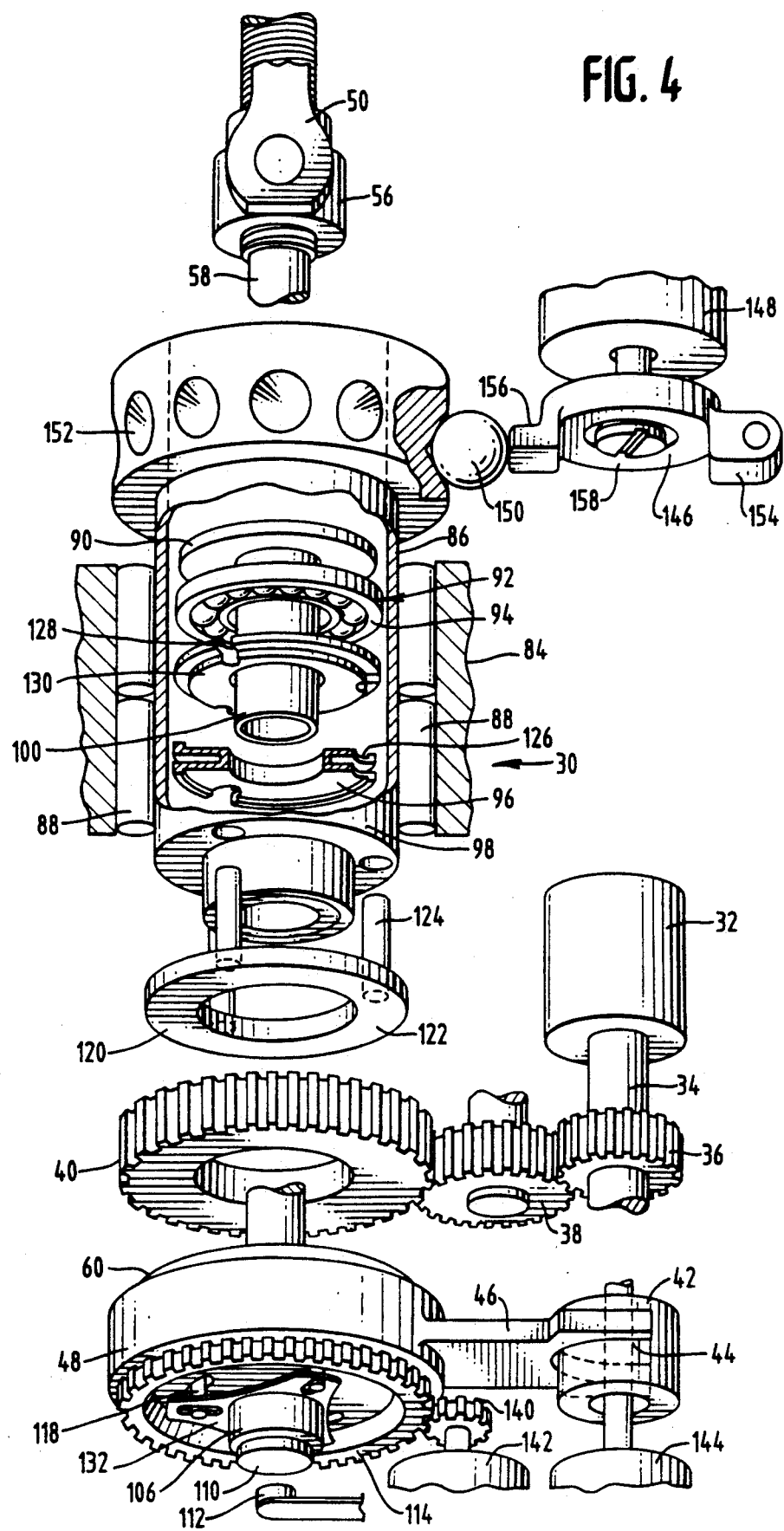
FIG. 4 is an exploded perspective view of a portion of the digit actuation mechanism of FIG. 2.

As shown in FIG. 3, the housing 12 of the end effector 10 includes a frame 84 for mounting the actuation mechanism 30 and the included digit 16 shown in FIG. 2. The frame 84 rotatably mounts a turret 86 via bearings 88. The turret 86 contains the drive shaft 58 and a portion of the actuation mechanism 30. The digit base 24 which contains the differential transmission 52 extends from the top of the turret 86 and mounts the base and tip sections 26 and 28 of the digit 16. As described hereafter, the turret 86 is rotatably driven by the actuation mechanism 30 to control the angular position of the digit 16.

The drive shaft 58 is movable axially in response to loads on the digit 16, and such axial movement is sensed to determine the load. A flange 90 which is mounted on the drive shaft 58 bears upon a bearing assembly 92 which is disposed about the drive shaft 58 below the flange 90 and which includes a bearing 94 and a strain spring 96. The strain spring 96 bears against a flanged portion 98 of the bottom of the turret 86. The flange 90 has a generally cylindrical body portion 100 thereof which extends along the drive shaft 58 within the flanged portion 98 of the turret 86. A bearing 102 rotatably mounts the body portion 100 and thereby the shaft 58 within the flanged portion 98.

When the digit 16 encounters a substantial load or resistance and the drive shaft 58 continues to rotate in response to the action of the sprag clutch arrangement 62, a downward force is exerted on the drive shaft 58. The downward force is a direct measure of the load on the digit 16. The drive shaft 58 moves axially downwardly in response to such force and against the resistance of the sprain spring 96 seated on the flanged portion 98. The strain spring 96, which is of generally cylindrical configuration, has a generally U-shaped cross-sectional shape which deforms and is compressed as the downward force on the drive shaft 58 forces the drive shaft with the flange 90 and the bearing 94 downwardly onto the strain spring 96. The downward movement of the drive shaft 58 is measured by a sensor assembly 104 at the bottom of the drive shaft 58. A generally cylindrical element 106 mounted on the lower end of the drive shaft 58 by a screw 108 has a magnet 110 mounted thereon. The magnet 110 is disposed adjacent a Hall Effect sensor 112 fixedly mounted on the bottom of the housing 12 at the end effector 10.

As the drive shaft 58 moves axially downwardly in response to substantial loads on the digit 16, the magnet 110 is moved closer to the Hall Effect sensor 112. The extent of downward movement of the drive shaft 58 is proportional to the size of the load on the digit 16. Accordingly, the proximity of the magnet 110 to the Hall Effect sensor 112 provides a direct indication of the amount of force of the digit 16.

The ability to sense loads on the digit 16 by detecting a reactive force on the drive shaft 58 is advantageous. Gripping force is determined in this manner, without measurement of the resistance. It is only necessary that the sudden increase in resistance be detected.

As previously described in connection with FIGS. 5 and 6, the sprag carrier assembly 64 includes the disk 66 which forms the slip clutch 60 together with the gear 40. When the load on the digit 16 causes the rotational resistance of the drive shaft 58 to exceed the predetermined level so that the disk 66 slips within the gear 40, the oscillating motion of the cyclic hoop 48 of the sprag clutch rotatably advances the drive shaft 58 in incremental fashion. Conversely, when the load on the digit 16 is small enough that the rotational resistance of the drive shaft is below the predetermined level, the disk 66 of the sprag carrier assembly 64 rotates directly with the gear 40.

When the disk 66 of the sprag carrier assembly 64 rotates directly with the gear 40 so that the slip clutch 60 does not slip, the sprag carrier assembly 64 is coupled to the drive shaft 58 for driving thereof by a gear 114 mounted on the drive shaft 58 and having three different slots 116 therein. The slots 116 receive pins 118 which extend downwardly from the sprag carriers 68. When the sprag carrier assembly 64 rotates in a given direction, the pins 118 engage one end of each of the slots 118 to rotate the gear 114 and thus the drive shaft 58. FIG. 6 shows the pins 118 within the slots 116 and the manner in which the pins 118 engage one end of each slot 116 for driving of the gear 114 in a given direction. The presence of the slots 116 allows for the oscillatory motion of the sprag carrier assembly 64 without affecting the gear 114, when the sprag clutch arrangement 62 is used to drive the drive shaft 58.

Thus, as described above, the slots 116 in the gear 114 provide for direct coupling of the sprag carrier assembly 64 to the drive shaft 58 via the gear 114. In addition, the presence of the slots 116 acts to limit the maximum forces on the sprags 80 by limiting the compression on the springs 68. This reduces the friction torque between the sprags 80 and the cyclic loop 48 so that the sprags 80 do not jam during low load, high speed operation when the first slip clutch 60 does not slip and the gear 40 is directly coupled to the drive shaft 58. The small amount of friction on the sprags 80 is more than overcome by the torque of the slip clutch 60.

The slots 116 in the gear 114 also allow decoupling of the friction torque of the gear 40 and the disk 66 from the forces applied to the sprags 80 during low load, high speed operation. This permits optimization of the friction torque between the gear 40 and the disk 66 through selection of the springs 82.

The gear 40 also forms a second slip clutch 120 for purposes of rotatably driving the turret 86. The second slip clutch 120 is formed by the gear 40 together with a generally disk-shaped assembly 122 disposed above and partly within the gear 40 and residing immediately below the flange portion 98 at the bottom of the turret 86. The disk-shaped assembly 122 is directly coupled to the turret 86 by a plurality of upwardly extending pins 124 at the top of the disk-shaped assembly 122 which are received within mating apertures in the flange portion 98 at the bottom of the turret 86. The pins 124 also reside within notches 126 in the strain spring 96 and pronotches 128 within a generally disk-shaped member 130 disposed between the strain spring 96 and the bearing 94. This prevents rotation of the strain spring 96 and the disk-shaped member 130 as the drive shaft 58 and the included flange 90 rotate within the turret 86.

As described hereafter, the second slip clutch 120 formed by the gear 40 together with the disk-shaped assembly 122 provides direct coupling of the motor 32 to rotatably drive the turret 86 to a desired rotational position. When the desired rotational position is reached, the turret 86 is locked in such position, and the second slip clutch 120 thereafter slips as the gear 40 continues to be driven by the motor 32. The second slip clutch 120 performs a further function of protecting the digit 16 and the actuation mechanism 30 from damage. Should the digit 16 strike one of the other digits 18 or 20 or an immovable object during movement thereof, the second slip clutch 120 simply slips, thereby protecting the digit 16 and the actuation mechanism 30 until the problem is solved.

Figure 7:
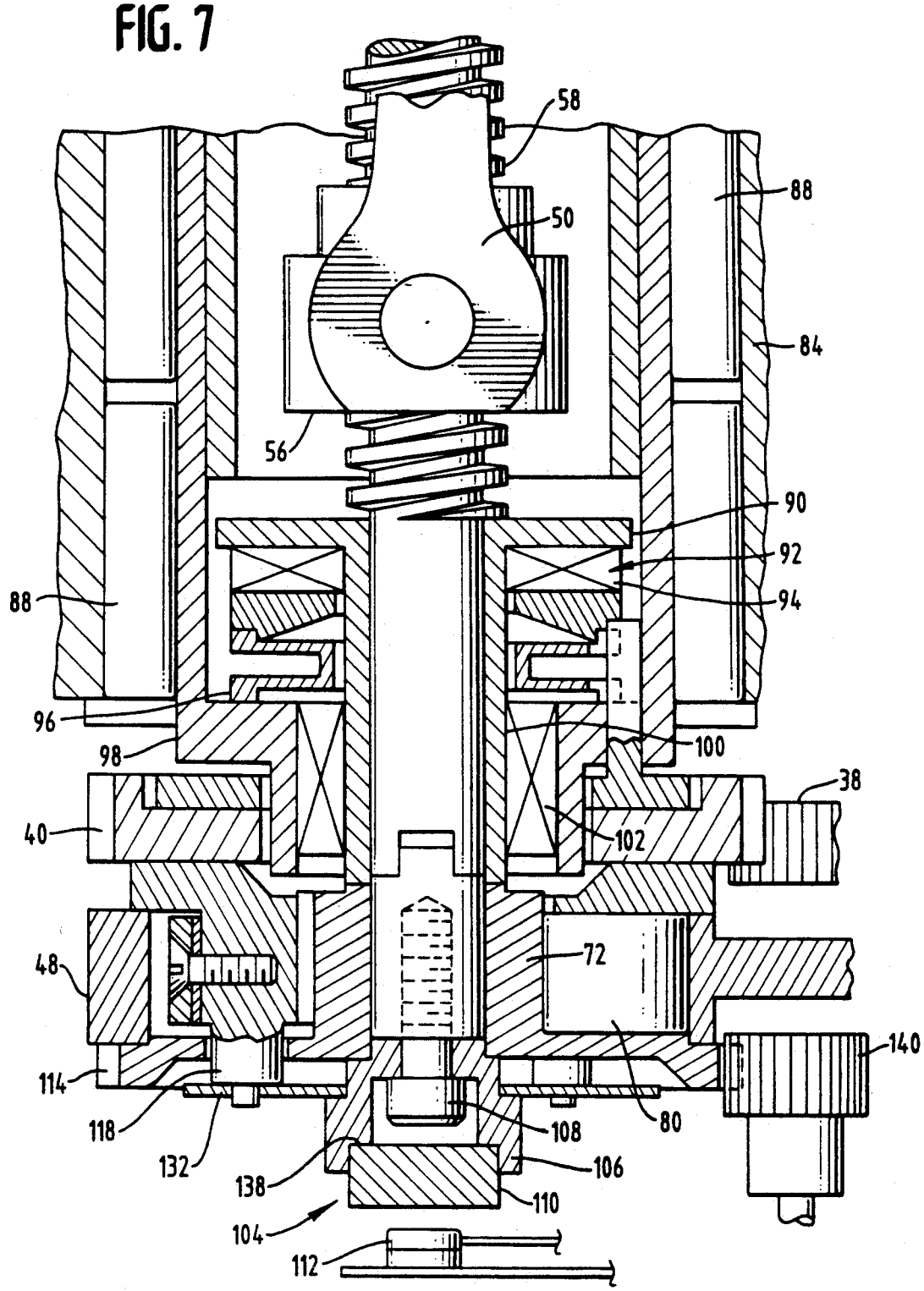
FIG. 7 is an enlarged view of a portion of the sectional view of FIG. 3.

The friction of the first slip clutch 60 formed by the gear 40 together with the disk 66 of the sprag carrier assembly 64, and the friction of the second slip clutch 120 formed by the gear 40 together with the disk-shaped assembly 122, are controlled by a spring 132 which is of generally convex configuration as shown in FIG. 7. The spring 132 is mounted on portions of the pins 118 at the bottoms of the sprag carrier 68 which extend through the slots 116 in the gear 114. The spring 132 is disposed at the underside of the gear 114, and has apertures 134 therein for receiving the pins 118. The convex shape of the spring 132 causes it to curve downwardly from the apertures 134 to an aperture 136 at a central portion thereof which receives the upper portion of the cylindrical element 106 so as to reside against an annular shoulder 138 within the cylindrical element 106. Because the cylindrical element 106 is secured to the bottom of the drive shaft 58, the spring 132 has the effect of pushing upwardly on the sprag carrier assembly 64 relative to the drive shaft 58. This results in the disk 66 of the sprag carrier 64, the gear 40 and the disk-shaped assembly 122 being forced together beneath the flanged portion 98 of the turret 86. The resilience of the spring 132 is selected to produce a desired amount of friction at the interface between the gear 40 and the disk 66 of the sprag carrier assembly 64 forming the first slip clutch 60, and at the interface of the gear 40 and the disk-shaped assembly 122 forming the second slip clutch 120.

The biasing action of the spring 132 occurs independently of the action of the strain spring 96 which permits downward movement of the drive shaft 58 in response to loads on the digit 16. As the drive shaft 58 moves up and down under the control of the strain spring 96, the spring 132 continues to bias the first and second slip clutches 60 and 120 to maintain the desired amount of friction therein.

As previously noted, the gear 114 is directly mounted on the drive shaft 58. The gear 114 is therefore utilized to provide an indication of the rotational position of the drive shaft 58. The gear 114 constantly meshes with a gear 140 at the top of an optical sensor 142. The optical sensor 142 responds to movement of the gear 140 produced by movement of the gear 114 to provide a continuous indication of the rotational position of the drive shaft 58. A further optical sensor 144 which is disposed next to the optical sensor 142 at the lower end of the housing 12 of the end effector 10 is coupled to the lower end of the motor shaft 34. The optical sensor 144 provides a continuous indication of the rotational position of the motor shaft 34.

The relatively small single motor 32 of the actuation mechanism 30 is employed to rotatably position the digit 16 in addition to operating the base and tip segments 26 and 28 thereof. This is accomplished by rotatably driving the turret 86 through the second slip clutch 120 in the manner previously described. As the motor 32 continuously drives the gear 40 via the gears 36 and 38, the second slip clutch 120 formed by the gear 40 together with the disk-shaped assembly 122 attempts to rotatably drive the turret 86. The turret 86 rotates until a desired rotational position is reached. At that point, an elongated, pivotally mounted pawl 146 which is operated by a solenoid 148 is biased downwardly by a spring 149 to force a ball 150 into a selected one of a plurality of detents 152 formed in spaced-apart relation about the outer surface of the turret 86 adjacent the top thereof. The pawl 146 is pivotally mounted at a first end 154 thereof, and an opposite second end 156 thereof engages the ball 150. An intermediate portion 158 of the pawl 146 is coupled to the solenoid 148 and to the spring 149. The resulting arrangement provides a substantial mechanical advantage in terms of forcing the ball 150 into one of the detents 152 with considerable force, using a relatively small solenoid 148. In addition, the solenoid 148 need only be energized when the rotational position of the turret 86 is being changed. The rest of the time, the solenoid 148 is not energized, and this represents a considerable savings in energy.

When the rotational position of the turret 86 is to be changed, the solenoid 148 is energized, and this pivots the pawl 146 upwardly against the resistance of the spring 149. This action permits the ball 156 to retract from the detent 152, so that the turret 86 rotates under the action of the second slip clutch 120. When the turret 86 reaches a desired rotational position, energization of the solenoid 148 is terminated, and the spring 149 pivots the pawl 146 downwardly, thereby forcing the ball 150 at the second end 156 of the pawl 146 into one of the detents 152.

The turret 86 remains locked in this position until it is once again desired to change the rotational position thereof. When that occurs, the solenoid 148 is again energized long enough to permit the ball 150 to withdraw from the detent 152. The turret 86 then rotates under the action of the second slip clutch 120 until the turret 86 reaches a new rotational position. At that point, the solenoid 148 is deenergized, forcing the ball 150 into the detent 152 at the new position so as to lock the turret 186.

The rotational position of the turret 186 is determined by an optical sensor 160 mounted adjacent the ball 150 on an upper portion of the frame 84 within the housing 12. The optical sensor 160 senses the presence of each of the detents 152 thereat. By keeping a count of each detent 152 which passes the optical sensor 150 after the turret 86 has assumed a reference position, the rotational position of the turret 86 is thereby determined.

Initialization of the end effector 10 is performed periodically, such as during start-up and in the case of a power outage. Initialization enables the various sensors to relate to reference positions established during initialization in determining the exact positions of the base and tip segments 26 and 28 of each of the digits 16, 18 and 20 as well as the rotational positions of the digits as determined by the positions of the turrets 86 housing the digits.

Initialization of each digit 16, 18 and 20 is accomplished in three stages. The stages include turret position initialization, digit position initialization and digit nominal positioning.

During turret position initialization of each digit such as the digit 16, the solenoid 148 is energized to permit rotation of the turret 86. With no load on the digit 16, the first slip clutch 60 drives the drive shaft 58 in response to the motor 32. Because the solenoid 148 is energized, the turret 86 is free to rotate, and does so in response to rotation of the drive shaft 58. Because the turret 86 and the drive shaft 58 rotate together with no relative movement therebetween, the position of the nut 56 on the drive shaft 58 remains constant, and the position of the digit 16 does not change. This is advantageous for purposes of the initialization process, and is possible because the single motor 32 is used both to manipulate the digit 16 and to vary the rotational position thereof. Eventually, the turret 86 reaches and engages a mechanical stop 162, so that further rotation of the turret 86 is prevented. This completes the turret position initialization stage.

After the turret 86 strikes the stop 162, the digit position initialization stage begins. With the turret 86 residing against the stop 162 and therefore unable to continue rotation, relative movement between the turret 86 and the drive shaft 58 commences. This causes the digit 16 to move outwardly in the gripping direction. Such outward movement of the digit continues until the nut 56 reaches its upper limit and strikes the top of the turret 86. With the nut 56 in the upper limit position, the resulting reactive force on the drive shaft 58 begins to compress the strain spring 96, and this condition is immediately detected by the Hall Effect sensor 112. This completes the digit position initialization stage.

Following completion of the digit position initialization stage, the digit nominal position stage is begun. During the digit nominal position stage, the drive shaft 58 is rotated by a fixed amount as determined by the optical sensor 142, and this raises the digit 16 to its most vertical and upright position. This completes the digit nominal position stage.

Thereafter, the end effector 10 is operated in a desired manner to grip and release objects of various different sizes and shapes. Rotation of the turret 86 from the reference position defined by the mechanical stop 162 is recorded by the optical sensor 160 which responds to the passage of each detent 152 so that the exact rotational position of the turret 86 is thereafter determined. The optical sensors 142 and 144 continue to monitor the rotational positions of the drive shaft 58 and the motor shaft 34 so that the exact position of the digit 16 and the base and tip segments 26 and 28 thereof is continuously determined. The Hall Effect sensor 112 responds to downward movement of the drive shaft 58 to detect a high load on the digit 16.

Figure 8:
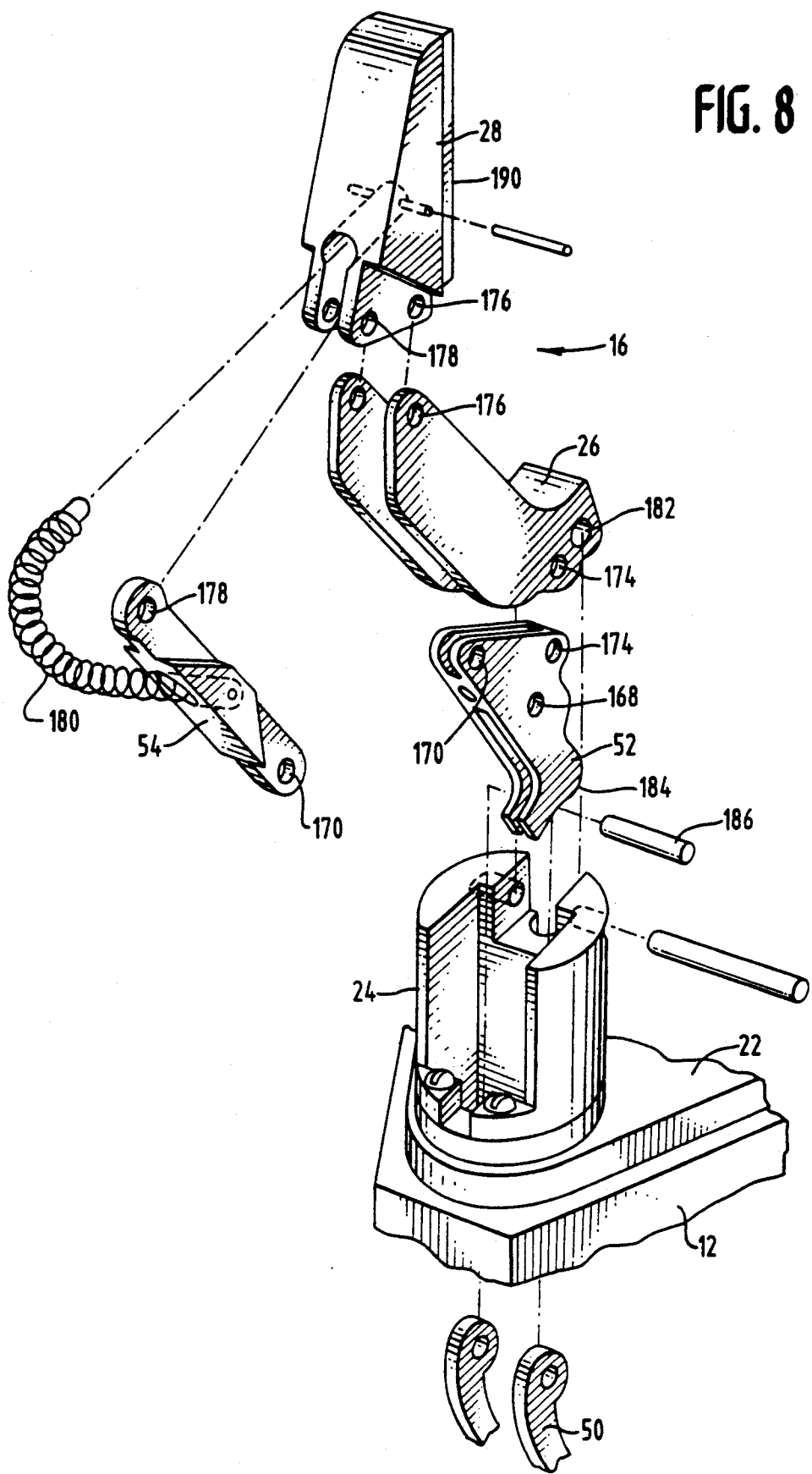
FIG. 8 is an exploded perspective view of the digit of FIG. 2.

FIGS. 8-11 show the details of the digit 16 with the included base and tip segments 26 and 28 and the digit base 24. Such figures also illustrate the manner in which the digit 16 assumes different positions in response to movement of the nut 56 along the drive shaft 58 and the resulting upward and downward movement of the drive linkage 50 in response thereto. As shown in FIG. 8, the digit 16 includes the drive pivot member 52 which is pivotally coupled to the upper end of the drive linkage 50 at a freely rotating joint 168. The drive pivot member 52 has a further freely rotating joint 170 pivotally coupled to a lower end of the digit linkage 54 which resides within the base segment 26. A still further freely rotating joint 174 in the drive pivot member 52 is pivotally coupled to a lower end of the base segment 26.

The lower end of the tip segment 28 is pivotally coupled to the upper end of the base segment 26 at a freely rotating joint 176 to provide relative pivoting movement between the tip and base segments 28 and 26. The tip segment 28 has a further freely rotating joint 178 which is pivotally coupled to an upper end of the digit linkage 54. A spring 180 extends between and has the opposite ends thereof coupled to the tip segment 28 and the digit linkage 54.

The construction and the operation of the digit 16 are similar to the digits shown and described in the previously referred to co-pending application Ser. No. 07/512,042 of Bartholet. Reference is made to that application for a more detailed discussion of the different operating modes of digits of this type. The Bartholet application also describes the manner in which the plural digits of an end effector are rotated to assume a particular relationship relative to each other in order to accomplish gripping of a variety of objects of different shapes and sizes. Accordingly, the operation of the digit 16 is only briefly described herein in connection with FIGS. 8-11.

The drive pivot member 52 serves to translate the generally linear motion of the drive linkage 50 into a pivoting motion of the base segment 26 about a freely rotating joint 182 which pivotally couples the base segment 26 to the digit base 24, and into a pivoting motion of the tip segment 28 about the pivot joint 176. The spring 180 pulls on the digit linkage 54 and thereby provides a small counter clockwise torque on the drive pivot member 52 about the pivot joint 174. This holds a cam surface 184 of the drive pivot member 52 against a parallel stop 186, when the digit 16 is not in contact with an object. Therefore, actuation of the drive linkage 50 in an upward direction causes the base segment 26 to pivot about the pivot joint 182 in a clockwise direction, while the tip segment 28 translates in an arc about the pivot joint 182 but remains parallel to a vertical axis 188 about which the digit base 24 rotates.

Upon contacting of an object, free rotation about the pivot joint 182 is terminated. Depending upon the contact point of the digit 16 with the object, the drive pivot member 52 pivots about either the pivot joint 174 or the pivot joint 182. This selective pivoting, determined from the point of contact with the object, results in either an enveloping grip by the digit 16 or a parallel vice grip. The distances between the pivot joints 168 and 174 and between the pivot joints 174 and 182 determine the critical contact point at which the grasping action of the digit 16 changes from a parallel vice grip to an enveloping grip mode. In FIG. 8, the critical contact point comprises a point 190 on the tip segment 28 which divides the tip segment 28 into outer and inner tip segment portions.

Figure 11:
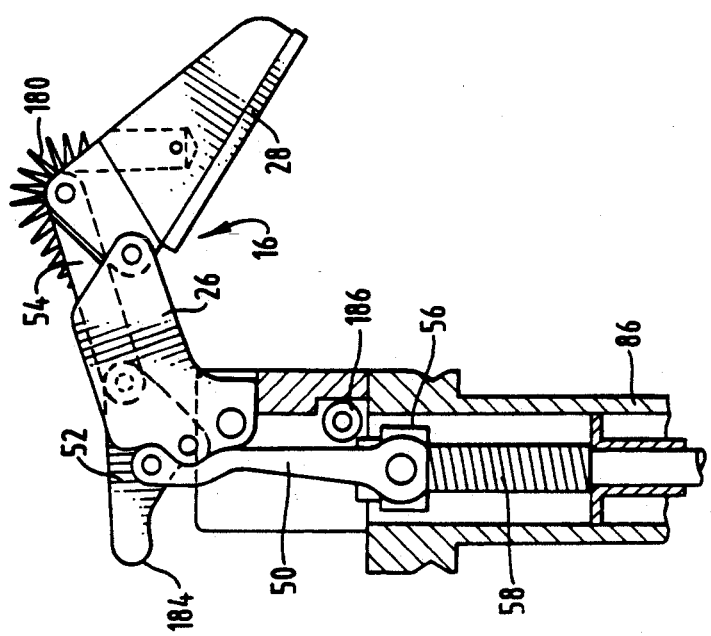
FIGS. 9-11 are side views of the digit of FIG. 8 illustrating different positions which the digit assumes upon being driven in order to envelope or grip objects of different sizes and shapes.
Figure 10:
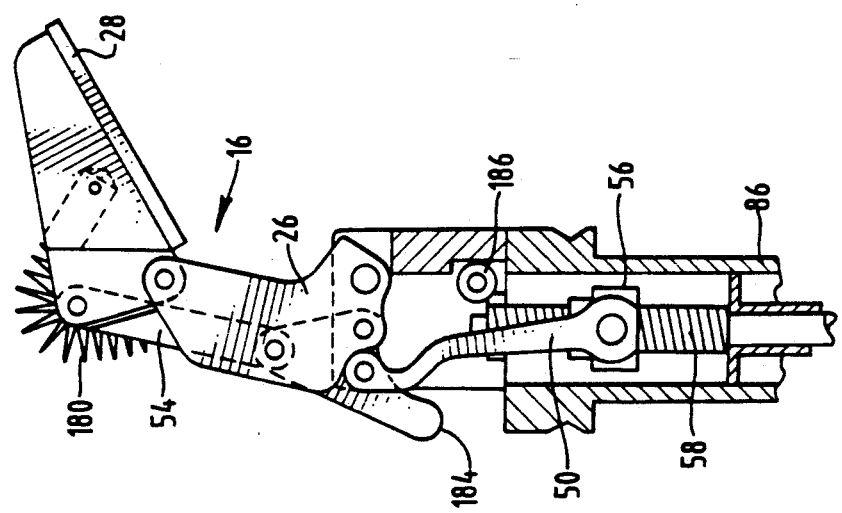
Figure 9:
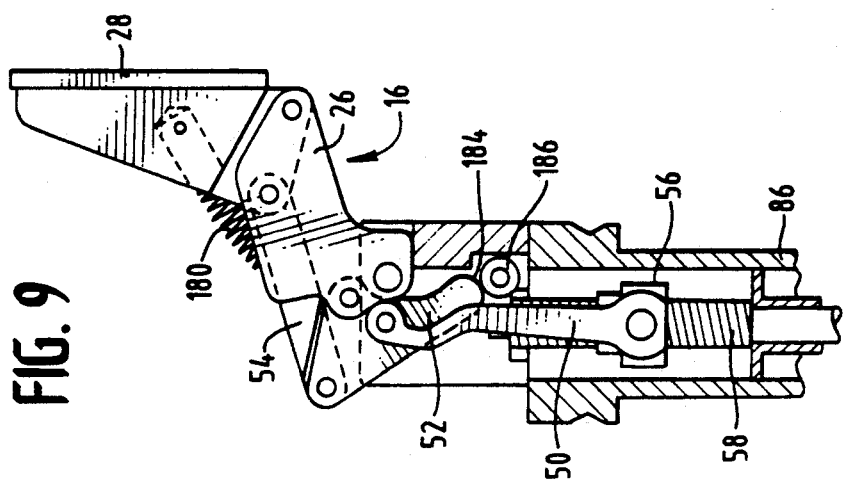

FIGS. 9-11 show three of the different positions which can be assumed by the digit 16 in response to the relative positioning of the nut 56 by the drive shaft 58 and the encountering of objects by the digit 16. As described above, the drive pivot member 52 responds to both the position of the nut 56 and the loads imparted to different portions of the digit 16 when objects of different sizes and shapes are encountered, to position the digit 16 accordingly. Again, the positioning of digits such as the digit 16 in response to such different situations is described in detail in the previously referred to Bartholet application.

In FIG. 9, the nut 56 assumes a particular position on the drive shaft 58 as shown, and the cam surface 184 on the drive pivot member 52 is in engagement with the parallel stop 186. The digit base 24 has pivoted so as to extend forwardly. At the same time, the positioning of the digit linkage 54 permits the spring 180 to hold the tip segment 28 in a raised position, as shown.

In FIG. 10, the nut 56 is positioned similarly to the positioning of the nut 56 in FIG. 9. However, the drive pivot member 52 does not have the cam surface 184 thereof in engagement with the parallel stop 186, but rather is pivoted away from the parallel stop 186. As seen in FIG. 10, this disposes the base segment 26 in a generally upwardly extending position, with the tip segment 28 extending outwardly against the resistance of the spring 180.

In FIG. 11, the nut 56 has been raised to a position close to the top end of the drive shaft 58. In addition, the drive pivot member 52 has been pivoted to an even more extreme position than that shown in FIG. 10. This disposes the base segment 26 in a forward position as shown, with the tip segment 28 being forwardly positioned relative to the base segment 26 so as to extend slightly downwardly.

Figure 12:
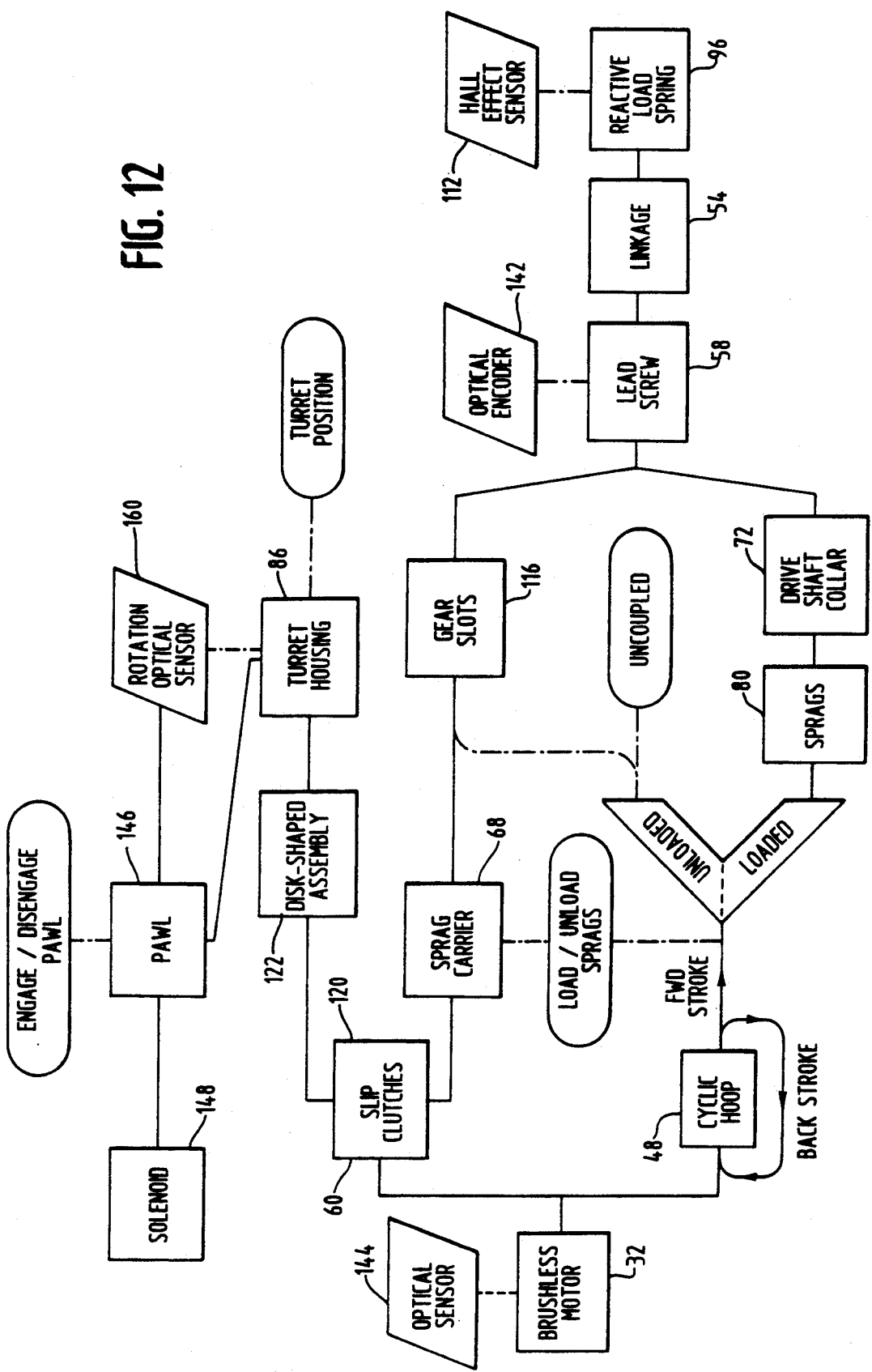
FIG. 12 is a block diagram comprising a flow chart which is helpful in explaining the operation of the digit actuation mechanism of FIG. 2.

FIG. 12 is a block diagram comprising a flow chart which helps in better understanding the actuation mechanism 30. As shown therein, the motor 32, the rotational position of which is sensed by the optical sensor 144, is coupled to drive the drive shaft 58 through either the cyclic hoop 48 or through the first slip clutch 60 which includes the sprag carrier assembly 64. The sprag carrier assembly 64 is coupled to drive the drive shaft 58 through engagement of the slots 116 in the gear 114 mounted on the drive shaft 58 by the pins 118.

When the rotational resistance of the drive shaft 58 exceeds the predetermined level, the first slip clutch 60 begins to slip, and the drive shaft 58 is driven using the cyclic hoop 48 which intermittently loads the sprags 80 to drive the drive shaft 58 through the collar 72 engaged by the sprags 80.

The digit linkage 54 responds to the digit 16 encountering a large load to provide compression of the strain spring 96 and accompanying movement of the drive shaft 58. This is detected by the Hall Effect sensor 112. The optical encoder 142 senses the rotational position of the drive shaft 58.

The motor 32 also functions to rotate the turret 86 through the second slip clutch 120 which includes the disk-shaped assembly 122 coupled to the turret 86. The solenoid 148 operates the pawl 146 to lock the turret 86 in a desired rotational position by forcing the ball 150 into one of the detents 152 as previously described. The optical sensor 160 determines the rotational position of the turret 86 by responding to the presence of each of the detents 152.

It will therefore be appreciated that end effectors in accordance with the invention provide numerous advantages. The ability to use the single relatively small motor 32 to control the digit 16 in combination with the sprag clutch arrangement 62 which is driven by the motor 32 in a manner providing substantial moment when required, allows the end effector 10 to be made in the relatively small sizes required for many applications. The drive provided by the single motor 32 in combination with the threaded drive shaft 58 within the turret 86 permits rotation of the turret 86 without changing the gripping position of the digit 16. Because rotation of the turret 86 is independent of the grip positioning of the digit 16, control of the digit 16 is simplified inasmuch as simultaneous monitoring of the position of the digit 16 and rotation of the turret 86 are not required. The turret 86 is rotatably positioned in predetermined locations by the detents 152, providing for simple and precise registration. This and the absence of any backdrive in the actuation mechanism 30 simplifies the process of monitoring the gripping and rotational positions of the digit 16.

The dual ratio transmission provided by the actuation mechanism 30 functions in conjunction with the optical sensors 142 and 144 for the drive shaft 58 and the motor shaft 34, respectively, to provide digital type sensing. Load range sensing is provided by the shift point which denotes the presence of a minimum load of predetermined size. Also, the load range shift point defines a minimum useful gripping force and starting point for purposes of controlling the digit 16. This can be used as a calibration point, for example, in calibrating the Hall Effect sensor 112.

The ability to detect the shift point in the dual ratio transmission is also useful in the sensing and control of the digit 16. For one thing, the shift point signals drive travel limits for the digit 16. Thus, if control of the digit 16 momentarily malfunctions and the drive of the digit 16 reaches either of opposite limits, the resulting transmission shift can be detected to stop the drive of the digit 16. During initialization, as previously pointed out, it is only necessary to sense when one or the opposite limits is reached. When searching for an object to be gripped, the shifting of the transmission denotes either that the object has been engaged or that the limit of digit travel has been reached. The information provided by the various sensors can then be used to make a control decision.

The dual ratio transmission of the actuation mechanism 30 provides still further advantages in the form of simplified motor servo design and a reduced motor speed range. The low load, high speed drive requires little torque, enabling use of relatively small slip clutches 60 and 120 for both movement of the digit 16 and rotation of the digit 16. If two of the digits 16, 18 and 20 collide, the slip clutches 60 and 120 prevent damage. In essence, a minimum amount of torque as provided by the slip clutches 60 and 120 suffices, except when gripping an object.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A digit actuation mechanism comprising:
a digit;
a rotatable shaft;
a drive linkage for driving the digit in response to rotation of the rotatable shaft;
a motor; and
means for coupling the motor to rotatably drive the shaft at a selected one of a plurality of different discrete drive ratios so as to drive the digit with variable speed and force for a given speed of the motor in response to the load on the digit, wherein said means for coupling provides a direct coupling of the motor to the shaft for a first range of loads on the digit and provides an oscillatory coupling of the motor to the shaft for heavier loads on the digit.

2. A digit actuation mechanism in accordance with claim 1, wherein the rotatable shaft is threaded and has a threaded nut mounted thereon, and the drive linkage is coupled between the nut and the digit.

3. A digit actuation mechanism, comprising:
a digit;
a rotatable shaft;
a drive linkage for driving the digit in response to rotation of the rotatable shaft;
a motor; and
means for coupling the motor to rotatably drive the shaft at a selected one of a plurality of different drive ratios so as to drive the digit with variable speed and force for a given speed of the motor, wherein the means for coupling is responsive to resistance of the shaft to rotation to drive the shaft at a first rate when the resistance of the shaft is below a predetermined level and to drive the shaft at a second rate different from the first rate when the resistance of the shaft is above the predetermined level, wherein the means for coupling includes:
a slip clutch coupled to drive the shaft at the first rate except when the resistance of the shaft is above the predetermined level, and
means coupled to drive the shaft at the second rate when the resistance of the shaft is above the predetermined level and thereby causes the slip clutch to slip, said means coupled to drive the shaft at the second rate comprising an oscillating arrangement for incrementally advancing the shaft in response to oscillatory movement thereof.

4. A digit actuation mechanism in accordance with claim 3 wherein the means for coupling is operative to select one of the plurality of different drive ratios in response to the load on the digit.

5. A digit actuation mechanism in accordance with claim 3, wherein the oscillating arrangement includes an eccentric bearing coupled to the motor, a cyclic hoop having an arm engaged by the eccentric bearing to oscillate the cyclic hoop in response to rotation of the eccentric bearing by the motor, and a sprag assembly disposed around the shaft and within the cyclic hoop.

6. A digit actuation mechanism comprising:
a digit;
a rotatable shaft coupled to drive the digit;
a motor having a motor shaft;
an eccentric bearing mounted on the motor shaft;
a hollow, generally cylindrical cyclic hoop disposed about a portion of the rotatable shaft and having an arm extending therefrom, the arm having a slot therein receiving the eccentric bearing so that rotation of the motor shaft and the eccentric bearing produces oscillation of the cyclic hoop;
a plurality of sprag carriers disposed in spaced-apart relation relative to each other between the cyclic hoop and the portion of the rotatable shaft; and
a plurality of sprags, each disposed between the cyclic hoop and the portion of the rotatable shaft and between a different pair of the sprag carriers.

7. A digit actuation mechanism in accordance with claim 6, wherein the rotatable shaft has a nut mounted thereon and is coupled to drive the digit by drive linkage coupled between the nut and the digit, and further comprising a slip clutch coupled to the rotatable shaft and including a gear coupled to be driven by the motor shaft.

8. A digit actuation mechanism in accordance with claim 6, further including a collar on the portion of the threaded shaft having an irregular outer surface adapted to wedge the sprags against the cyclic hoop at certain locations and a plurality of resilient elements disposed between the cyclic hoop and the collar and operative to bias the sprags in circumferential directions.

9. A digit actuation mechanism in accordance with claim 8, wherein the plurality of sprag carriers comprises three sprag carriers, the plurality of sprags comprises three sprags and the plurality of resilient elements comprises three resilient elements.

10. A digit actuation mechanism comprising:
a rotatably mounted turret containing a digit and having a plurality of detents therein;
a motor;
means coupling the motor to rotate the turret;
a turret locking apparatus disposed adjacent the rotatably mounted turret and including a ball and means for selectively engaging the ball and one of the plurality of detents via a biasing force, to lock the turret in a desired rotation position and thereby resist disturbing forces substantially exceeding said biasing force; and
a slip clutch coupled between the motor and the turret.

11. A digit actuation mechanism, comprising:
a rotatable mounted turret containing a digit and having a plurality of detents therein;
a motor;
means coupling the motor to rotate the turret; and
a turret locking apparatus disposed adjacent the rotatably mounted turret and including a ball selectively engaging one of the plurality of detents to lock the turret in a desired rotational position;
wherein the turret locking apparatus includes a solenoid operative to remove the ball from the plurality of detents when energized.

12. A digit actuation mechanism in accordance with claim 11, wherein the turret locking apparatus includes a pivotally mounted pawl coupled to the solenoid and operative to force the ball into one of the plurality of detents except when the solenoid is energized.

13. A digit actuation mechanism in accordance with claim 12, wherein the pawl is pivotally mounted to the solenoid at a first end thereof, has an opposite second end engaging the ball and an intermediate portion between the first and second ends coupled to the solenoid.

14. A digit actuation mechanism, comprising:
a rotatable mounted turret containing a digit and having a plurality of detents therein;
a motor;
means coupling the motor to rotate the turret;
a turret locking apparatus disposed adjacent the rotatably mounted turret and including a ball selectively engaging one of the plurality of detents to lock the turret in a desired rotational position; and
a sensor positioned adjacent the turret and operative to sense the presence of each of the plurality of detents thereat.

15. A digit actuation mechanism in accordance with claim 14, further including a stop member for stopping rotation of the turret at a predetermined rotational position, and wherein the sensor includes means for counting each sensing of the presence of a detent at the sensor to provide an indication of the rotational position of the turret relative to the stop member.

16. A digit actuation mechanism comprising:
a rotatable turret;
a digit mounted within the rotatable turret;
a rotatable shaft coupled to drive the digit;
a motor;
a gear driven by the motor;
a first slip clutch coupling the gear to the rotatable turret; and
a second slip clutch coupling the gear to the rotatable shaft.

17. A digit actuation mechanism in accordance with claim 16, wherein the first slip clutch comprises a disk slidably disposed within the gear and having a plurality of pins thereon extending into the rotatable turret to couple the rotatable turret thereto.

18. A digit actuation mechanism in accordance with claim 16, further including means for selectively locking the rotatable turret in a selected rotational position, the first slip clutch slipping when the rotatable turret is locked in a selected rotational position.

19. A digit actuation mechanism in accordance with claim 16, further including a low gear driving arrangement for selective coupling between the motor and the rotatable shaft, the second slip clutch slipping when the low gear driving arrangement is coupled between the motor and the rotatable shaft.

20. A digit actuation mechanism comprising:
a digit;
a rotatable shaft having an axis and coupled to drive the digit and being movable in the direction of said axis;
resilient means for normally biasing the rotatable shaft into a nominal axial position, the rotatable shaft undergoing axial movement from the nominal axial position against the biasing of the resilient means in response to a load on the digit; and
means for sensing movement of the rotatable shaft in said axial direction to provide an indication of the amount of load on the digit, said means for sensing movement comprising a magnet mounted on the rotatable shaft and a Hall Effect sensor disposed in a fixed position adjacent to the magnet.

21. A digit actuation mechanism in accordance with claim 20, wherein the resilient means comprises a generally cylindrical sprain spring disposed on the rotatable shaft and having a generally U-shaped resiliently compressible cross-sectional shape.

22. A digit actuation mechanism comprising:
a digit;
a rotatable threaded shaft having a nut mounted thereon;
drive linkage coupled to the nut and to the digit for operating the digit in response to movement of the nut along the threaded shaft;
a motor;
a first gear encircling the shaft and coupled to be driven by the motor;
a second gear mounted on the shaft;
a sprag carrier assembly encircling the shaft and slidably engaging the gear to form a slip clutch therewith;
means for selectively coupling the sprag carrier assembly to the second gear;
a hollow, generally cylindrical hoop encircling the sprag carrier assembly;
a plurality of sprags disposed between the sprag carrier assembly and the hoop; and
means coupling the motor to drive the hoop in oscillating fashion.

23. A digit actuation mechanism in accordance with claim 22, further comprising:
a rotatable turret having the digit mounted therein; and
a generally disk-shaped assembly encircling the shaft and slidably engaging the gear to form a second slip clutch therewith, the generally disk-shaped assembly having a plurality of pins thereon engaging the turret.

24. A digit actuation mechanism in accordance with claim 23, further including:
a flange mounted on the shaft; and
a bearing arrangement disposed between the flange and the generally disk-shaped assembly.

25. A digit actuation mechanism in accordance with claim 24, further including a spring seated on the sprag carrier assembly and engaging the shaft, the spring being operative to resiliently bias the first gear against the sprag carrier assembly and the generally disk-shaped assembly.

26. A digit actuation mechanism in accordance with claim 25, wherein the bearing arrangement includes a resiliently compressible, generally disk-shaped strain spring encircling the shaft between the flange and the generally disk-shaped assembly.

27. A digit actuation mechanism in accordance with claim 25, wherein the sprag carrier assembly comprises a generally disk-shaped member having a plurality of sprag carriers mounted thereon in spaced-apart relation and a plurality of pins extending from the sprag carriers into mating apertures in the spring to seat the spring on the sprag carrier assembly, and further comprising a generally cylindrical element coupled to an end of the shaft and engaged by a central portion of the spring.

28. A digital actuation mechanism in accordance with claim 27, wherein the second gear has a plurality of slots therein receiving the pins of the sprag carrier assembly, and further including a sensor coupled to the second gear for determining the rotational position of the shaft.

29. A digit actuation mechanism in accordance with claim 28, wherein the motor has a motor shaft, and further including a second sensor coupled to the motor shaft for determining the rotational position of the motor shaft.

* * * * *